United States Patent
Lüke et al.

(10) Patent No.: US 8,812,193 B2
(45) Date of Patent: Aug. 19, 2014

(54) METHOD FOR DETERMINING A VIRTUAL VEHICLE CORRIDOR

(75) Inventors: Stefan Lüke, Olpe (DE); Dirk Waldbauer, Eppstein (DE); Michael Darms, Lindau (DE); Thomas Berthold, Darmstadt (DE); Matthias Komar, Frankfurt am (DE)

(73) Assignees: Conti-Temic Microelectronic GmbH (DE); Continental Teves AG & Co. oHG (DE)

( * ) Notice: Subject to any disclaimer, the term of this patent is extended or adjusted under 35 U.S.C. 154(b) by 15 days.

(21) Appl. No.: 13/696,399

(22) PCT Filed: May 6, 2011

(86) PCT No.: PCT/DE2011/001039
§ 371 (c)(1),
(2), (4) Date: Jan. 15, 2013

(87) PCT Pub. No.: WO2011/141018
PCT Pub. Date: Nov. 17, 2011

(65) Prior Publication Data
US 2013/0197804 A1 Aug. 1, 2013

(30) Foreign Application Priority Data
May 11, 2010 (EP) .................................... 10401067

(51) Int. Cl.
*A01B 69/00* (2006.01)
(52) U.S. Cl.
USPC ........................................... 701/41; 701/423

(58) Field of Classification Search
CPC ........... G08G 1/095; G08G 1/07; G08G 9/00; G01C 21/00; G01C 21/34
USPC .......................................... 701/423, 428, 438
See application file for complete search history.

(56) References Cited

U.S. PATENT DOCUMENTS

| | | | | |
|---|---|---|---|---|
| 5,991,427 A | * | 11/1999 | Kakinami et al. | 382/104 |
| 2009/0088966 A1 | * | 4/2009 | Yokoyama et al. | 701/201 |
| 2009/0195414 A1 | * | 8/2009 | Riegel et al. | 340/995.19 |
| 2010/0256852 A1 | * | 10/2010 | Mudalige | 701/24 |
| 2010/0289632 A1 | * | 11/2010 | Seder et al. | 340/436 |
| 2011/0121993 A1 | * | 5/2011 | Davis et al. | 340/911 |
| 2011/0190972 A1 | * | 8/2011 | Timmons et al. | 701/29 |
| 2012/0139775 A1 | * | 6/2012 | Popovic | 342/173 |

FOREIGN PATENT DOCUMENTS

| | | |
|---|---|---|
| DE | 197 38 764 A1 | 3/1999 |
| DE | 10 2005 002 719 A1 | 8/2006 |
| EP | 1 552 975 A2 | 7/2005 |

OTHER PUBLICATIONS

International Preliminary Report on Patentability for International Application No. PCT/DE2011/001039 dated Nov. 13, 2012.
International Search Report for PCT Application No. PCT/DE2011/001039 mailed Oct. 28, 2011.

* cited by examiner

*Primary Examiner* — Hussein A. Elchanti
(74) *Attorney, Agent, or Firm* — PatnerPrestia

(57) ABSTRACT

A method for assisting a vehicle driver, wherein a sensor for covering the surroundings covers a pavement in front of the vehicle in order to determine a virtual vehicle corridor for a road vehicle in a complex traffic situation and the virtual vehicle corridor is determined depending on identified traffic lines and raised pavement boundaries.

10 Claims, 3 Drawing Sheets

METHOD FOR DETERMINING A VIRTUAL VEHICLE CORRIDOR

CROSS REFERENCE TO RELATED APPLICATIONS

This application is the U.S. National Phase Application of PCT/DE2011/001039, filed May 6, 2011, which claims priority to European Patent Application No. 10401067.3, filed May 11, 2010, the contents of such applications being incorporated by reference herein.

FIELD OF THE INVENTION

The invention relates to a driver assistance system for determining a virtual vehicle corridor for a road vehicle in a complex traffic situation.

BACKGROUND OF THE INVENTION

At present, driver assistance systems for lane keeping or lane departure warning are commercially available. A sensor system is used to cover that part of the surroundings of the vehicle which is in front of the vehicle as well as to identify traffic lines. The identified traffic lines (usually dashes or lines on the pavement) demarcate the future traffic lane. In a complex traffic situation, particularly in the region of a construction site with a plurality of traffic lines, a conventional driver assistance system cannot reliably determine the virtual vehicle corridor any more.

BRIEF DESCRIPTION OF THE INVENTION

An aspect of the present invention provides an improved method and an improved device for determining a virtual vehicle corridor for a road vehicle in a complex traffic situation.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

The difference between the method for determining a virtual vehicle corridor presented herein, wherein a sensor for covering the surroundings covers a pavement in front of the vehicle, and conventional systems consists in the fact that, according to said method, the virtual vehicle corridor is determined depending on identified traffic lines and raised pavement boundaries. Raised pavement boundaries are, e.g., crash barriers, distance markers, vehicles driving at the side, and walls of construction sites. In the following, said raised pavement boundaries will be referred to as pavement boundaries. In particular, a complex traffic situation is a situation in which more than one traffic line or traffic lane boundary is identified.

Figure 1:
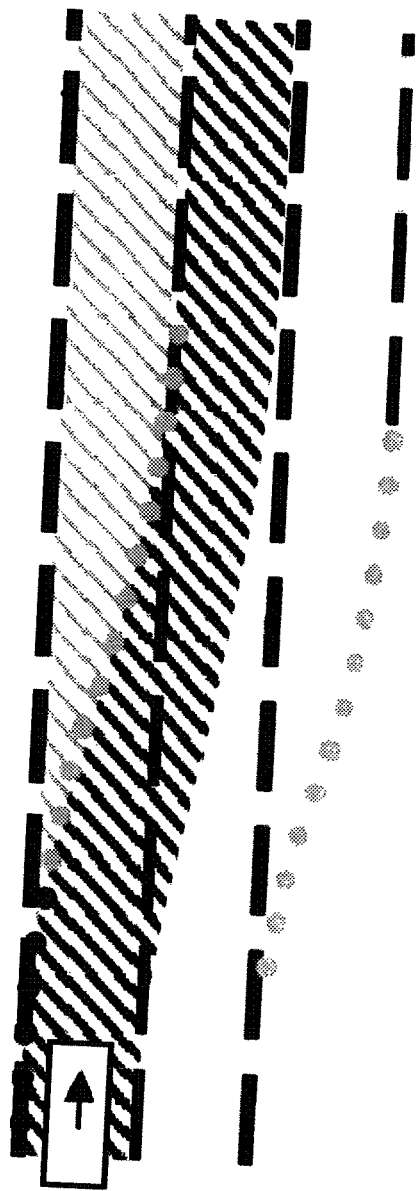
FIG. 1 shows a traffic situation with traffic lines (dashes) and distance markers (dots) for demarcation.

In a particular realization of the invention, a pavement boundary is given more weight than a traffic line in order to determine the most probable virtual vehicle corridor, i.e., the virtual vehicle corridor is determined on the basis of probability considerations and being allowed to cross a traffic line is more likely than being allowed to cross a pavement boundary. FIG. 1 shows a traffic situation with traffic lines (dashes) and distance markers (dots) for demarcation. The ego-vehicle is shown as a rectangle with an arrow that indicates the direction of motion. The most probable virtual vehicle corridor (dark-hatched region) extends along the distance markers since this boundary has a higher weight than traffic lines.

In a positive realization of the invention, an identified traffic line and pavement boundary is weighted depending on its type in order to determine the most probable virtual vehicle corridor. For example, a property of the pavement marker or boundary is one criterion for weighting. For example, the property may be defined on the basis of whether or not to cross the line or boundary. An example of a three-grade weighting is: "crossing not recommended" (low weight), "crossing prohibited" (medium weight), "crossing not possible" (high weight). Of course, weighting may comprise any number of grades.

In a preferred realization of the invention, the pavement width of a possible virtual vehicle corridor is assessed depending on one or more typical pavement properties. The following is a list of examples of typical pavement properties:

a) A typical pavement is demarcated by traffic lines and/or traffic lane boundaries on the right and on the left.

b) The typical width of a pavement is 2.0 m to 3.75 m. In a particular realization, the most probable pavement width can be determined on the basis of the road type (expressway, country road, etc.) or a piece of information about the surroundings (e.g., region of a construction site). The road type and the piece of information about the surroundings are provided by, e.g., a GPS system or on the basis of data of the sensor that covers the surroundings.

c) Typically, the width of the pavement is almost constant.

d) The pavement begins directly in front of the vehicle, and the further course of the pavement can be tracked within the coverage of the sensor.

Figure 2:
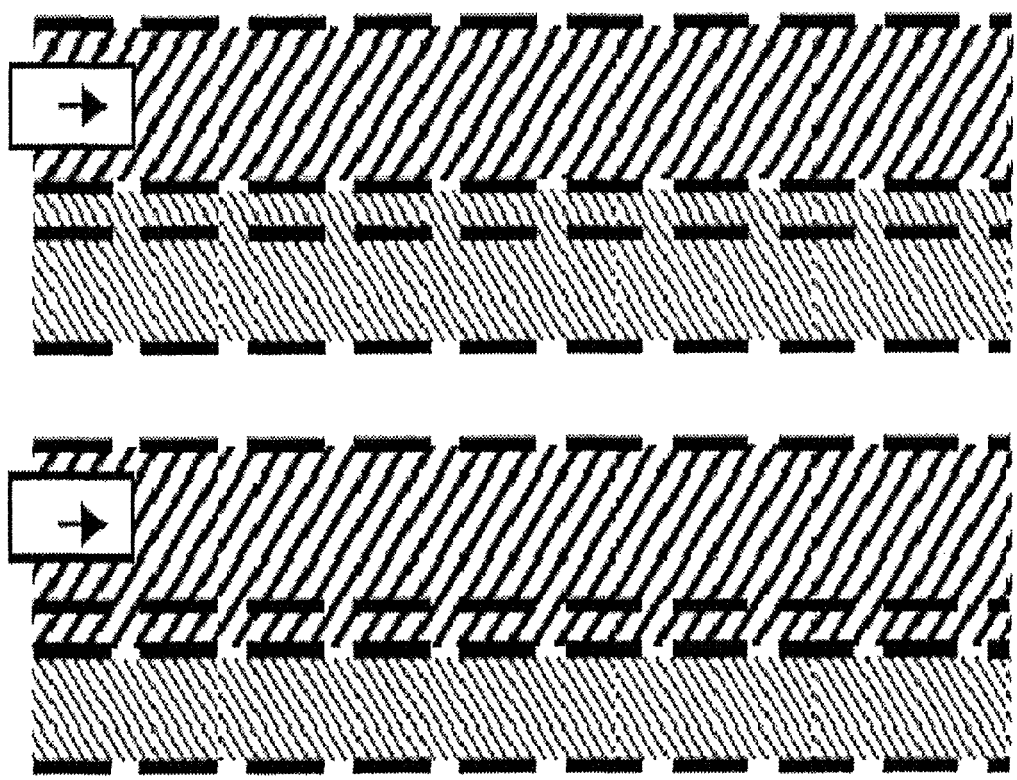
FIG. 2 shows four traffic lines that demarcate two adjacent virtual vehicle corridors.

In a preferred realization of the invention, the similarity of a possible virtual vehicle corridor is assessed depending on adjacent possible virtual vehicle corridors. For example, the width of the traffic lanes is one criterion. Usually, adjacent traffic lanes are approximately the same width. When there is a construction site (e.g., on an expressway), the left traffic lane may be slightly narrower. In the following, such a traffic situation will be explained by way of example on the basis of FIG. 2. FIG. 2 shows four traffic lines that demarcate two adjacent virtual vehicle corridors. The ego-vehicle is shown as a rectangle with an arrow that indicates the direction of motion. In the upper picture, the second traffic line from the top is selected as a separating line between the adjacent virtual vehicle corridors so that two virtual vehicle corridors that are the same width are formed. The virtual vehicle corridors can be identified by their different hatchings. In the lower picture, the third traffic line from the top is selected as a separating line between the adjacent virtual vehicle corridors so that virtual vehicle corridors of different widths are formed. In this exemplary embodiment, virtual vehicle corridors that are the same width are preferred unless a further piece of information about the surroundings (region of a construction site, a road sign indicating lane narrowing, etc.) indicates a different kind of action, which results in a virtual vehicle corridor of the type described in the lower picture of FIG. 2, for example.

In a particular realization of the invention, a possible virtual vehicle corridor is assessed depending on whether any pavement boundaries cross. Usually, crossing pavement markers are to be expected only in a transition region (e.g., where entering or leaving the region of a construction site) but not for the further course of the virtual vehicle corridor. Therefore, a virtual vehicle corridor without any crossing pavement markers and/or pavement boundaries outside a transition region is preferred to a virtual vehicle corridor with crossing pavement Markers and/or pavement boundaries or weighted accordingly.

In a preferred realization of the invention, a possible virtual vehicle corridor is assessed depending on the driving maneuvers that have to be performed in order to follow said virtual vehicle corridor. If it is sufficient to perform a moderate driving maneuver in order to drive in the virtual vehicle corridor, said virtual vehicle corridor is considered to be more likely than a virtual vehicle corridor that is possible as well but would require a great change of the speed and the direction of the ego-vehicle. For example, a moderate driving maneuver is a maneuver in which the change of the speed and/or of the direction is smaller than a predetermined threshold value.

A device for determining a virtual vehicle corridor for a road vehicle comprises a sensor for covering the surroundings. The sensor may be a camera, a lidar sensor and a radar sensor. The sensor may be designed for further functions, e.g., object recognition, adaptive cruise control, road sign recognition or road type recognition. Furthermore, an evaluation unit is provided in which an above-described method is stored. Furthermore, a display device for outputting the virtual vehicle corridor to the driver and/or a device for performing an automatic steering or braking intervention are/is provided. For example, an automatic intervention is designed in such a manner that at least one of the following rules is followed:

If the virtual vehicle corridor is straight, the vehicle is kept in the middle of the virtual vehicle corridor, particularly if both vehicle corridor boundaries are of the same type.

Figure 3:
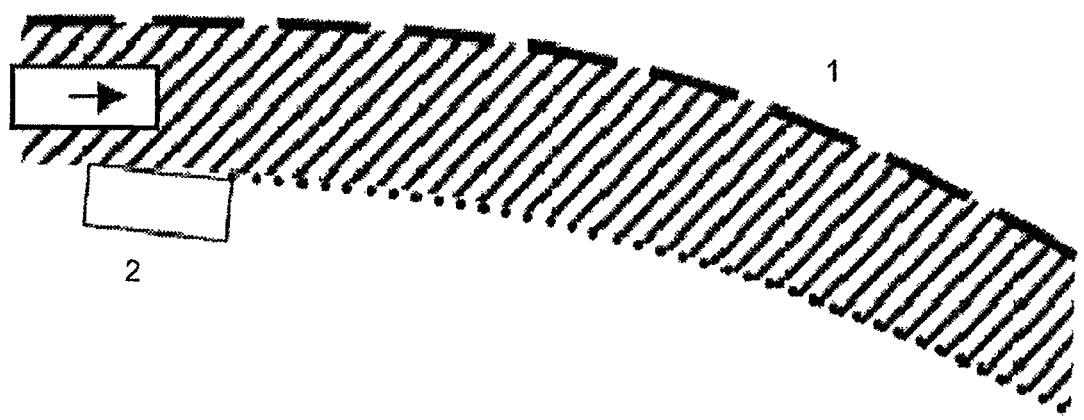
FIG. 3 shows a situation in which the left edge of the virtual vehicle corridor is demarcated by a traffic line and the right edge is demarcated by another vehicle.

Predetermined types of pavement boundaries are kept at a distance as a matter of priority. FIG. 3 shows a situation in which the left edge of the virtual vehicle corridor (hatched region) is demarcated by a traffic line (1) and the right edge is demarcated by another (non-ego) vehicle (2). The ego-vehicle is shown as a rectangle with an arrow that indicates the direction of motion. The distance from the other vehicle is selected such that it is greater than the distance from the pavement marker. In other exemplary embodiments, a distance from another vehicle is greater than the distance from another raised pavement boundary. Furthermore, a distance from a raised pavement boundary may be greater than the distance from a traffic line.

Controlling the vehicle in such a manner that driving is economical: steering interventions and (negative) accelerating interventions are reduced to a minimum.

The invention claimed is:

1. A method for assisting a driver of a vehicle, the method comprising:
   detecting, by a sensor mounted to the vehicle, traffic line boundaries and pavement boundaries on a road on which the vehicle is traveling in order to determine a virtual vehicle corridor on the road for the vehicle to follow in a complex traffic situation;
   determining, by a processor in the vehicle, the virtual vehicle corridor based on the detected traffic line boundaries and the detected pavement boundaries; and
   controlling, by the processor, the vehicle to keep a greater distance from one of the sides of the virtual vehicle corridor depending on a type of the detected boundaries when the boundaries left of and right of the virtual vehicle corridor are not of the same type.

2. The method according to claim 1, further comprising:
   weighting a traffic line or traffic lane boundary depending on its type in order to determine the virtual vehicle corridor.

3. The method according to claim 1, further comprising:
   giving a pavement boundary more weight than a traffic line in order to determine the virtual vehicle corridor.

4. The method according to claim 1, further comprising:
   assessing the pavement width of a possible virtual vehicle corridor depending on one or more typical pavement properties in order to determine the virtual vehicle corridor.

5. The method according to claim 1, further comprising:
   assessing the similarity of a possible virtual vehicle corridor depending on adjacent possible virtual vehicle corridors in order to determine the virtual vehicle corridor.

6. The method according to claim 1, further comprising:
   assessing a possible virtual vehicle corridor depending on whether any pavement boundaries cross.

7. The method according to claim 1, further comprising:
   assessing a possible virtual vehicle corridor depending on the driving maneuvers that have to be performed in order to follow said virtual vehicle corridor.

8. The method according to claim 1, further comprising:
   keeping the vehicle in the middle of the virtual vehicle corridor when the traffic lines or traffic lane boundaries left of and right of the virtual vehicle corridor are of the same type.

9. A device for determining a virtual vehicle corridor for a road vehicle comprising:
   a sensor for covering the surroundings of the vehicle and detecting traffic line boundaries and pavement boundaries on a road on which the vehicle is traveling in order to determine a virtual vehicle corridor on the road in a complex traffic situation,
   an evaluation unit for determining the virtual vehicle corridor based on the detected traffic line boundaries and the detected pavement boundaries, and for controlling the vehicle to keep a greater distance from one of the sides of the virtual vehicle corridor depending on a type of the detected boundaries when the boundaries left of and right of the virtual vehicle corridor are not of the same type; and
   a display device for outputting the virtual vehicle corridor to the driver and/or a device for performing an automatic steering or braking intervention.

10. A vehicle with a device comprising:
    a sensor for covering the surroundings of the vehicle and detecting traffic line boundaries and pavement boundaries on a road on which the vehicle is traveling in order to determine a virtual vehicle corridor on the road in a complex traffic situation,
    an evaluation unit for determining the virtual vehicle corridor based on the detected traffic line boundaries and the detected raised pavement boundaries and for controlling the vehicle to keep a greater distance from one of the sides of the virtual vehicle corridor depending on a type of the detected boundaries when the boundaries left of and right of the virtual vehicle corridor are not of the same type; and a display device for outputting the virtual vehicle corridor to the driver and/or a device for performing an automatic steering or braking intervention.

\* \* \* \* \*